Feb. 5, 1952   G. E. BERINGER   2,584,832
METHOD OF MAKING A TRUNNION FOR AIRCRAFT LANDING GEARS
Original Filed April 7, 1945   2 SHEETS—SHEET 1

INVENTOR.
GEORGE E. BERINGER
BY
T. J. Plante
ATTORNEY

Feb. 5, 1952   G. E. BERINGER   2,584,832
METHOD OF MAKING A TRUNNION FOR AIRCRAFT LANDING GEARS
Original Filed April 7, 1945                    2 SHEETS—SHEET 2
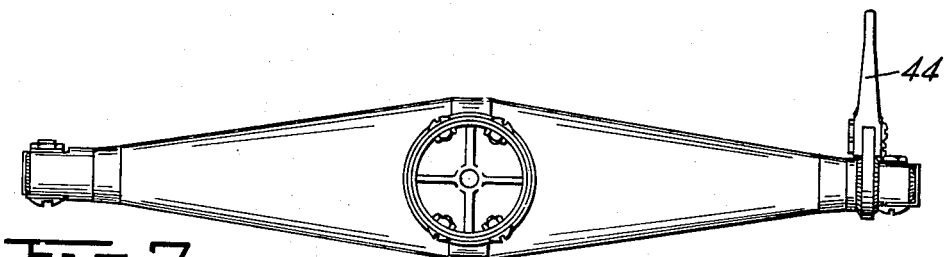
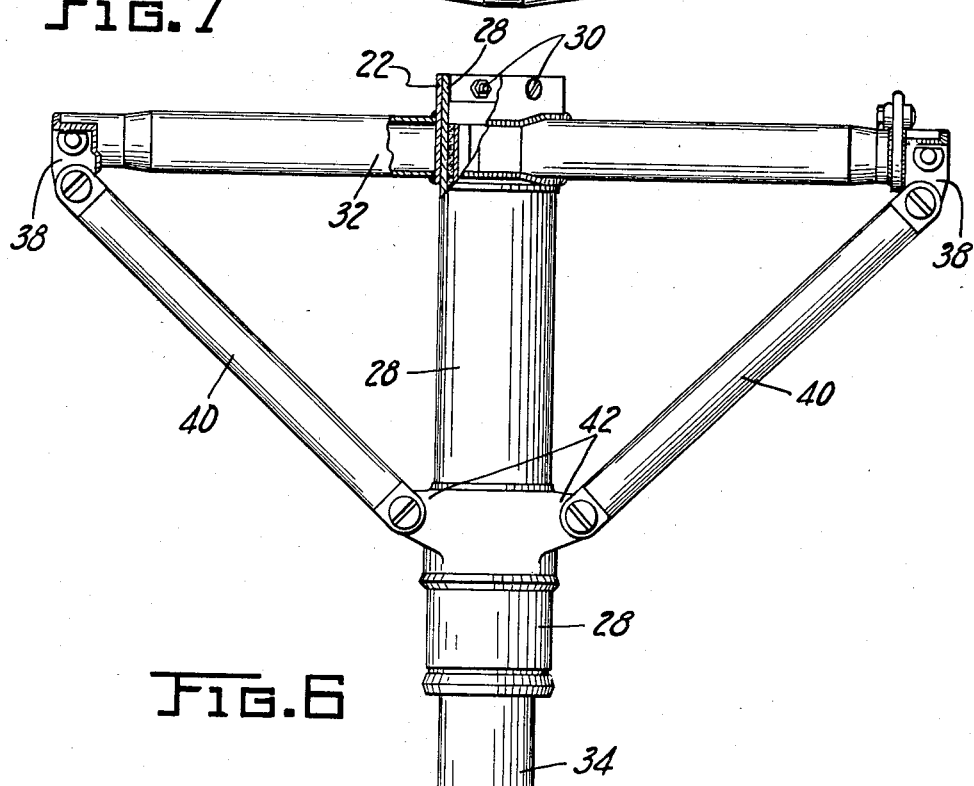
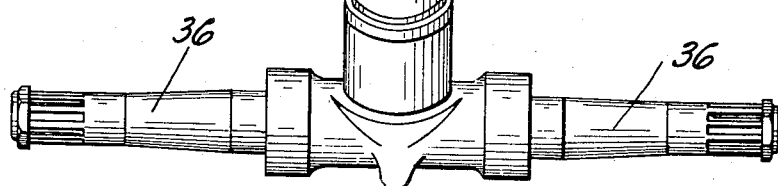
INVENTOR.
GEORGE E. BERINGER
BY
T. J. Plante
ATTORNEY Patented Feb. 5, 1952

2,584,832

UNITED STATES PATENT OFFICE 2,584,832

METHOD OF MAKING A TRUNNION FOR AIRCRAFT LANDING GEAR

George E. Beringer, South Bend, Ind., assignor to Bendix Aviation Corporation, South Bend, Ind., a corporation of Delaware Original application April 7, 1945, Serial No. 587,058. Divided and this application October 3, 1945, Serial No. 619,943

1 Claim. (Cl. 29—152)

This invention relates to the construction of a supporting beam for aircraft landing gear, i. e., the structural member by which the upper portion of the landing gear is secured to the body of the aircraft. Usually this member will also act as a trunnion during rotation of the landing gear into retracted position.

An object of the present invention is to provide a landing gear supporting beam or trunnion which can be formed with fewer operations and less expensively than has heretofore been the case.

A further object of the present invention is to provide a landing gear supporting beam or trunnion which will weigh appreciably less than similar members heretofore used.

A still further object of the present invention is to form a landing gear supporting beam or trunnion from a seamless tubular blank, thereby obtaining substantial homogeneity in the metal of the finished product, and improving its strength characteristics and reliability.

A still further, and more specific, object of the present invention is to utilize the principles set forth in Dewey Patent No. 2,265,723, issued December 9, 1941, in shaping the landing gear supporting beam or trunnion from a tubular blank, thereby making it possible to control the wall thickness of the beam or trunnion and, in general, distribute the metal most advantageously in affording the required strength and rigidity while maintaining the weight at a minimum.

The present application is a division of application Serial No. 587,058, filed April 7, 1945, now Patent No. 2,440,068, the instant claim being directed to the novel method utilized in making the product, whereas the claims of the parent application are confined to the improved product.

Further objects will become apparent during the following discussion of a detailed exemplification of the invention.

In the drawings:

Figure 6 is a front elevation showing the completed landing gear assembly, including the trunnion of the preceding figures; and Figure 7 is a plan view of the structure shown in Figure 6.

Figure 1:
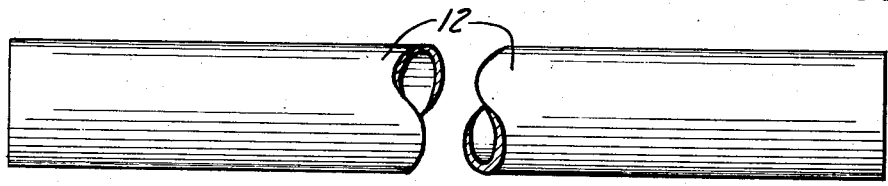
Figure 1 shows a tubular blank from which the trunnion is formed.
Figure 2:
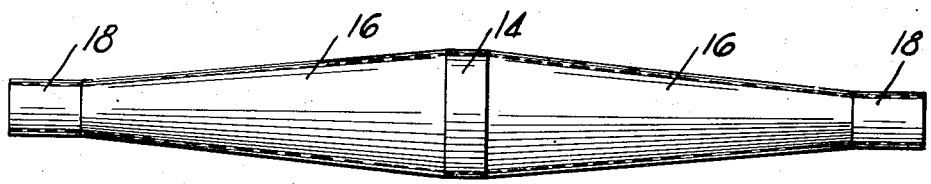
Figure 2 shows the shape of the member after the Dewey process has been used in configuring the tubular blank of Figure 1.

The tubular blank 12 of Figure 1, which is preferably seamless in order to provide homogeneity of the metal in the finished trunnion, is first formed to the shape shown in Figure 2 by the method described in Dewey Patent 2,265,723, issued December 9, 1941. By using the process of the Dewey patent it is possible to reduce a length of tubing of uniform diameter and circular cross-section, as shown in Figure 1, to the desired outer diameter, while at the same time controlling the thickness of the tube wall in accordance with the structural requirements of the member being formed. This feature is particularly important in the construction of airplane parts, because it permits the formation of hollow structural members having the least possible weight consistent with strength and rigidity requirements.

As illustrated in Figure 2, the center portion 14 of the reduced tube is allowed to retain the original outer diameter for a short distance. On each side of the center portion 14 of the reduced tube a tapering portion 16 is provided which terminates in a relatively small diameter end portion 18. The shaped tube forms a symmetrical structure, the several portions of which remain parts of an integral and homogeneous metal structure.

Because of strength requirements, I prefer to increase the wall thickness of the end portions 18 slightly over the wall thickness of the center portion 14. However, it will be apparent from the drawings that the difference in wall thickness is very slight, and does not necessarily bear a relation to the reduction in outer diameter. Utilization of the process described in the aforementioned Dewey patent makes it possible to provide an amount of metal at various sections which corresponds to the structural requirements, without necessitating excess weight due to lack of controllability of the exact dimensions of the formed tube. The importance of such weight reduction in airplane use is well recognized.

In an ordinary swaging operation, when an amount of metal is displaced as a result of diameter reduction, it results in a corresponding increase in wall thickness. In other words, the cross-sectional area remains substantially constant throughout the swaging. However, by using the Dewey forming process, it is possible to control the wall thickness as desired, holding it the same, or even decreasing it during the diameter-reduction. In actual practice, in forming the trunnion under discussion, I have found it advisable to increase the wall thickness about twenty-five percent. But this is mentioned by way of illustration, merely.

Furthermore, the use of the tubular blank avoids the necessity for welding or like operations to provide a seam between separately formed half-shells, thereby eliminating expense, and insuring, insofar as possible, sameness of the material throughout.

Figure 3:
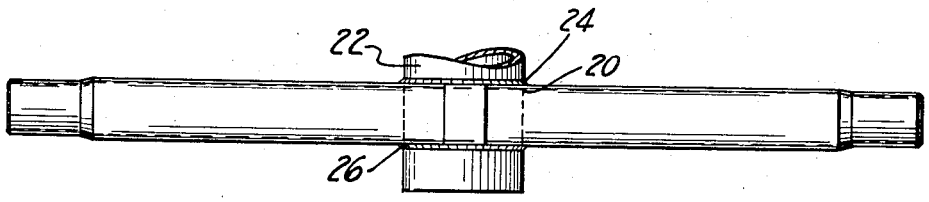
Figure 3 shows the member of Figs. 1 and 2 after the flattening operation has been performed on the spun or reduced tube, and after a center opening has been drilled in the trunnion and a sleeve inserted therethrough.
Figure 4:
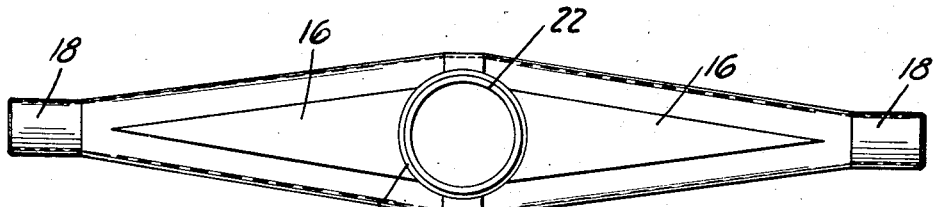
Figure 4 is a plan view of the structure shown in Figure 3.
Figure 5:
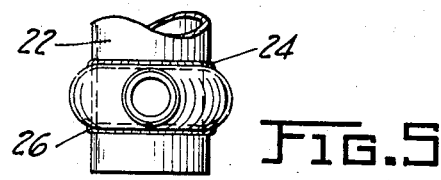
Figure 5 is an end view of the structure shown in Figs. 3 and 4.

After the tube has been formed to the shape shown in Figure 2, the center portion 14 and the tapered portions 16 thereof are flattened to provide a substantially elliptical cross-section which gradually merges into the cylindrical end portions 14, as illustrated in Figs. 3 to 5 inclusive. While external pressure is being applied to flatten the tube, preferably a high internal pressure is maintained by means of liquid introduced under pressure.

The major axis of the ellipse is in a substantially horizontal plane (as shown in Fig. 5). Thus, the maximum resistance of the trunnion or beam to external bending loads acts horizontally, or, in other words, in a direction to counteract the drag load, which is the greatest bending load imposed upon the beam. Furthermore, the maximum horizontal width at the center of the beam enables it to receive the upper end of the airplane landing gear.

For this purpose, aligned openings 20 are provided in the upper and lower walls of the flattened tube. A sleeve 22 is then inserted through the openings 20 and welded as indicated at 24 and 26 to the hollow trunnion or supporting beam. This sleeve provides a member to which the upper end of the landing gear may conveniently be attached, and additionally strengthens the center portion of the beam to aid in resisting the maximum bending moments. Although the center of the trunnion must be sufficiently wide to receive the sleeve 22, it would be a waste of material and would add unnecessary weight to retain this width throughout the length of the trunnion. For this reason the sides of the portions 16 of the trunnion converge rather sharply, as shown particularly in Fig. 4, until they merge with the end portions 18, which have an inner diameter sufficiently large to receive, after machining of said inner diameter, the members on which the trunion is supported and which serve as pivots during retraction of the landing gear.

The completed landing gear assembly is shown in Figs. 6 and 7, wherein it will appear that the upper end of the cylindrical upper member 28 of the landing gear shock strut is secured by means of a plurality of bolts 30 to the sleeve 22 which is supported in the trunnion 32. The lower member 34 of the shock strut, which is telescopically arranged within the outer member 28 has mounted thereon the axles 36 arranged to receive the wheels associated with the landing gear.

To provide additional support for the upper member 28 of the shock strut, fittings 38 may be welded to opposite ends of trunnion 32 (a portion of the trunnion ends being cut away for this purpose), and links 40 may connect the fittings 38 to ears 42 welded to strut member 28. The links 40 thus support strut member 28 at a point spaced from the support provided for said strut member by trunnion 32. The links 40 are primarily responsible for withstanding the vertical load on the landing gear due to the weight of the airplane.

An arm 44 is welded to trunnion 32 and is connected at its opposite end to landing gear retraction apparatus. As explained above, the ends of the trunnion are pivotally supported in members which are secured to the body of the airplane. Force exerted through arm 44 therefore rotates trunnion 32 to retract the landing gear.

From the foregoing description, it will be appreciated that the trunnion 32 is a structure sufficiently strong for its purposes and yet having a minimum weight, and is a structure which is especially reliable because of its formation from a homogeneous tubular blank. Furthermore, the steps necessary to form the trunnion 32 are few in number and relatively simple.

Although a particular embodiment of my invention has been described, it will be understood by those skilled in the art that the object of the invention may be attained by the use of constructions different in certain respects from that disclosed without departing from the underlying principles of the invention. I therefore desire by the following claim to include within the scope of my invention all such variations and modifications by which substantially the results of my invention may be obtained through the use of substantially the same or equivalent means.

I claim:

The method of making a trunnion for an aircraft landing gear which consists in first configuring an integral section of cylindrical tubing of uniform diameter and wall thickness by a reducing operation to provide a unit of appreciably greater diameter and slightly lesser wall thickness at its center portion merging on both sides into intervening body portions of gradually reducing diameter which in turn merge at the outer ends of the tubing into cylindrical sections of slightly increased wall thickness but appreciably reduced diameter, thereafter by a separate operation flattening the walls of the center and tapered portions of the tubing to give to the same a substantially elliptical cross-section progressively approaching circularity to merge with the cylindrical outer ends of the tubing, and machining the inner diameter of the cylindrical end portions to receive pivot members which are mounted on the body of the aircraft and on which the trunnion is adapted to be mounted.

GEORGE E. BERINGER.

REFERENCES CITED

The following references are of record in the file of this patent:

UNITED STATES PATENTS

| Number | Name | Date |
|---|---|---|
| 1,091,751 | Mogan | Mar. 31, 1914 |
| 1,209,134 | Dodge et al. | Dec. 19, 1916 |
| 1,596,544 | Kroesen | Aug. 17, 1926 |
| 1,652,630 | Mogford | Dec. 13, 1927 |
| 1,905,150 | Clark | Apr. 25, 1933 |
| 2,133,091 | Gettig | Oct. 11, 1938 |
| 2,303,266 | Gettig | Nov. 26, 1942 |
| 2,329,168 | Wassall et al. | Sept. 7, 1943 |
| 2,380,952 | Dewey | Aug. 7, 1945 |